T. C. CONRAD.
NUT-LOCK.

No. 181,314.

Patented Aug. 22, 1876.

WITNESSES:
A. W. Almquist
John Goethals

INVENTOR:
T. C. Conrad
BY
ATTORNEYS.

UNITED STATES PATENT OFFICE.

THOMAS C. CONRAD, OF PHILADELPHIA, PENNSYLVANIA.

IMPROVEMENT IN NUT-LOCKS.

Specification forming part of Letters Patent No. 181,314, dated August 22, 1876; application filed August 7, 1876.

*To all whom it may concern:*

Figure 1:
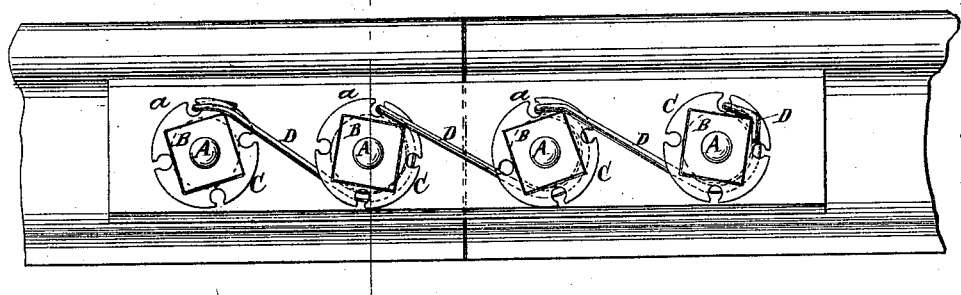
Figure 2:
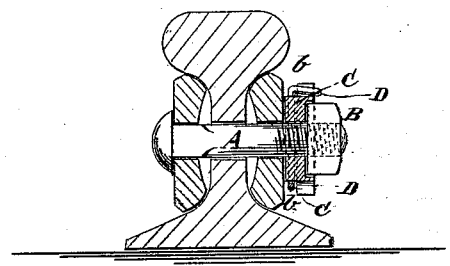
Figure 3:
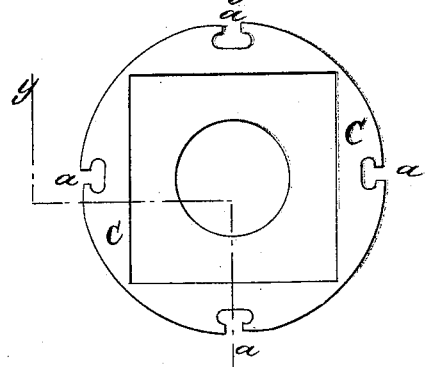
Figure 4:

Be it known that I, THOMAS C. CONRAD, of Philadelphia, in the county of Philadelphia and State of Pennsylvania, have invented a new and Improved Nut-Lock, of which the following is a specification:

In the accompanying drawing, Figure 1 represents a side elevation of my improved nut-lock as applied to a rail-joint; Fig. 2, a vertical transverse section of the same on the line $x\ x$, Fig. 1, and Figs. 3 and 4 are respectively a detail front view and a side view, partly in section, on line $y\ y$, Fig. 1, of the washer.

Similar letters of reference indicate corresponding parts.

My invention has reference to an improved nut-lock for rail-joints, and other parts exposed to vibratory motion, the nut-locks being so arranged and connected that the tendency of any one nut to work off tightens the other nuts, and that the expansion and contraction of the bolts, and change of position in the ends of rails by the difference in temperature, exert no influence upon the lock.

The invention consists of a washer with recess for the nut to fit in slots in the circumference, and a circumferential recess at the backs, along which a stiff locking-wire is passed that is bent outwardly through the top slot, and then downwardly to the next washer, and around the same to the top slot, and so on.

In the drawing, A represents the bolts, and B the nuts, used for fastening the fish-plate of a rail-joint, or other vibrating parts of machinery, &c. The nuts B are fitted or sunk into front recesses of the washers C, which are provided with a suitable number of slots, $a$, at the circumference, that are preferably made larger at the inner end or base of the slots, and tapering from the wider rear end to the narrower front end. A circumferential recess, $b$, at the back of each washer forms, with the fish-plate, a groove for the locking-wire D that connects the washers. This locking-wire D has to be heavy enough to remain rigid when once bent, but not so stiff as to be troublesome in being put on the washers. The wire D is put on the washers after the nuts have been screwed up tight, by being first bent around back of first washer, and then forward through the top slot of the same, and then along the face of washer down to the back of the next adjoining washer and around the same, and through top slot to the front of the same, being again bent close to washer as before, and then brought to groove in back of third washer, and so on, the wire being bent on last washer, to secure it, around one corner of nut, as shown in Fig. 1.

The locking-wire is galvanized, to resist the influence of the weather. It binds rigidly on the washers, and prevents any loosening of the nuts, while providing readily for any change in the bolts or rails produced by a change of temperature. The nuts act reciprocally on each other, the tendency of any one to get loose being checked by the tendency of the locking-wire to tighten up the remaining nuts, so that a reliable, durable, and readily-applied nut-lock is obtained.

Having thus described my invention, I claim as new and desire to secure by Letters Patent—

1. The combination of bolts A, nuts B, washer C, provided with face recesses for nuts, slotted recesses at the circumference, and a circumferential recess at the back, and of locking-wire D, that extends from one washer to the other, in the manner substantially as and for the purpose set forth.

2. The washer C, provided with slots at the circumferences that are made wider at the lower part and tapering from back to front, substantially as specified.

3. A washer for nut-locks, having a circumferential recess at the back to secure the locking-wire passed around the washer, substantially as described.

THOMAS C. CONRAD.

Witnesses:
WM. F. SAGER,
CHAS. E. PANCOAST.